April 24, 1962     A. J. SAUR ET AL     3,031,393

COUPLED DIAPHRAGM NUCLEAR REACTOR SAFETY DEVICE

Filed Sept. 14, 1960     2 Sheets-Sheet 1

INVENTORS
ALBERT J. SAUR
WARREN K. MC CARTY JR.
BY   LINWOOD E. JOHNSON

*Gerald A. Koris*

ATTORNEY

April 24, 1962 A. J. SAUR ET AL 3,031,393
COUPLED DIAPHRAGM NUCLEAR REACTOR SAFETY DEVICE
Filed Sept. 14, 1960 2 Sheets-Sheet 2

INVENTORS
ALBERT J. SAUR
WARREN K. MC CARTY JR.
BY LINWOOD E. JOHNSON

*Gerald A. Koris*
ATTORNEY

United States Patent Office 3,031,393
Patented Apr. 24, 1962

3,031,393
COUPLED DIAPHRAGM NUCLEAR REACTOR
SAFETY DEVICE
Albert J. Saur, Canoga Park, and Warren K. McCarty, Jr., Woodland Hills, Calif., and Linwood E. Johnson, Corvallis, Oreg., assignors, by mesne assignments, to the United States of America as represented by the United States Atomic Energy Commission
Filed Sept. 14, 1960, Ser. No. 56,044
11 Claims. (Cl. 204—193.2)

Our invention relates to an integral safety device for a nuclear reactor. It is more particularly related to a safety device for a nuclear reactor whose trigger is a neutron flux sensor unresponsive to ambient temperature, which will trip the device and cause reactivity decrease at excessive neutron flux levels.

Although a nuclear reactor is designed to be highly safe, an independently actuated safety device is still desirable as back-up protection. Power reactors are protected by electronic circuitry and safety rods which shut the reactor down during undesired power surges. In the event that a reactor power excursion occurs by malfunctioning of the conventional control rods and safety circuits, physical damage to the core and fission product contamination of the system may result.

Independently actuated safety devices have been developed as back-up protection to the normal control and safety rod systems. The basic such device (see Report NAA-SR-1761 available from the Office of Technical Services, U.S. Department of Commerce) comprises generally a housing containing interconnected small and large chambers $BF_3$ gas is contained under pressure within the smaller chamber and a solder plug surrounded by a uranium heater is positioned in the connecting line. If the reactor flux rises beyond a predetermined point, heat developed by fissioning of the uranium melts the solder plug, and releases the $BF_3$ gas into the larger chamber where its effective neutron absorption is increased by the larger volume. While such devices are generally very satisfactory, the trigger mechanism is temperature as well as flux responsive. Thus, high temperatures may cause the solder plug to melt apart from reactivity surges and, conversely, excursions occurring during reactor start-up, when temperatures are low, may fail to rapidly actuate the triggering device.

The principal object of our present invention, accordingly, is to provide an improved integral safety device for a nuclear reactor which is only flux responsive.

Another object is to provide an integral, independently actuated safety device for a nuclear reactor having means for essentially eliminating the effects of ambient temperature on a trigger mechanism which operates to release a fluid adapted to decrease reactor reactivity.

Another object is to provide such a safety device in which mechanically coupled diaphragms are employed to minimize ambient temperature effects.

Still another object is to provide such a device in which the pressures of two chambers, one of which contains means responsive to neutron flux, are compared through a coupling pin to provide a trip point independent of ambient temperature, which introduces neutron absorbing means into a high flux region of the reactor, thereby effecting a decrease in reactivity.

Other objects and advantages of our invention will become apparent from the following detailed description taken together with the accompanying drawings, in which.

Basically, in our self-actuated safety device for a nuclear reactor, the trip signal for actuating the device is derived from the pressure difference between two fluid-filled chambers in which the fluid in one chamber is heated at a rate proportional to neutron flux. These two chambers connect to a pair of coupled diaphragms supported by a coupling pin. The coupling pin support is not affected by equal pressure changes in the two chambers due to temperature variations. Excessive pressure differences between the diaphragms due to flux heating causes first one diaphragm to burst, and with removal of the pin support, the second diaphragm fails, whereupon the fluid in the two chambers is released. The sudden motion of fluid thus produced is used to carry high neutron absorption cross section material, such as boron powder or $BF_3$ gas, into the core region. In our invention the trip point is sensitive to neutron flux and insensitive to ambient temperature because the trip signal is derived from the pressure difference attributable only to a flux increase.

Figure 1:
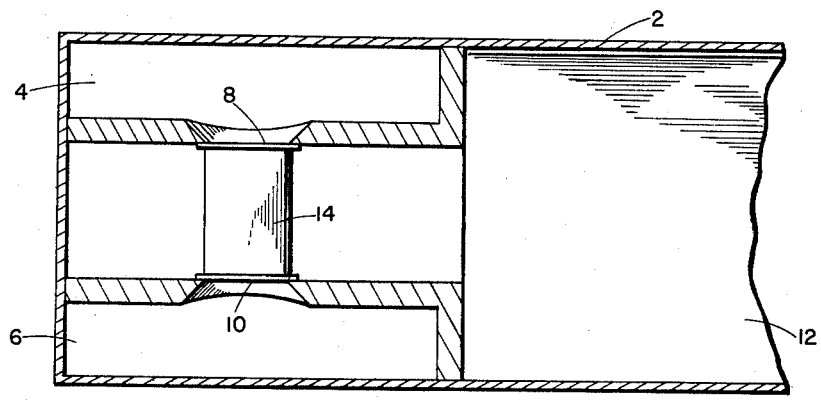
FIG. 1 is a schematic representation of one embodiment of our invention.

Turning now to FIG. 1, the entire unit is self-contained in housing 2. Chamber 4 is loaded with $B^{10}F_3$ gas and chamber 6 with normal $BF_3$ gas, initially at equal pressures. Chambers 4 and 6 are separated by diaphragms 8 and 10 from chamber 12. The diaphragms are coupled by pin 14. Chamber 12 is initially set at some low nominal pressure and chambers 4 and 6 at a relatively higher pressure. The pressure in either chamber is sufficient to burst the diaphragms, but these are supported and prevented from bursting by the coupling pin.

In operation, the coupled diaphragms respond to a pressure difference between the chambers. Because of the unequal concentrations of $B^{10}$ in the two chambers, a flux of neutrons produces more heat in chamber 4 than in chamber 6. In this way, a pressure difference is established between the chambers and across the coupled diaphragms which is proportional to neutron flux and independent of temperature. At a pre-selected pressure difference, one of the diaphragms fails and releases gas from one chamber into chamber 12. Since the supporting force is then removed from the coupling pin, the other diaphragm also fails. In this way, both chambers 4 and 6 are vented into chamber 12. In place of having $BF_3$ gas with different concentrations of the $B^{10}$ isotope in each chamber, normal $BF_3$ gas may be employed with uranium heater means positioned in one of the chambers. In this way, the flux of neutrons produces more heat in one chamber than in the other through fissioning of the uranium. The uranium heater may consist of uranium wire or foil, preferably enriched in U-235.

The device of FIG. 1 effects a decrease in the reactivity of the reactor by exhausting the $BF_3$ gas from a small volume (4 and 6) into a larger volume (12) where a larger surface of $BF_3$ is presented to the neutron flux, thereby increasing the amount of neutron capture and its effectiveness as a poison. The device may also be so situated with respect to the reactor core to produce a further decrease in reactivity, by placing chamber 12 in a region of the reactor core where the neutron flux is normally relatively higher than in chambers 4 and 6. In this way, the addition of $B^{10}F_3$ absorbs a large fraction of neutrons which otherwise would produce more fission in the reactor fuel.

Figure 2:
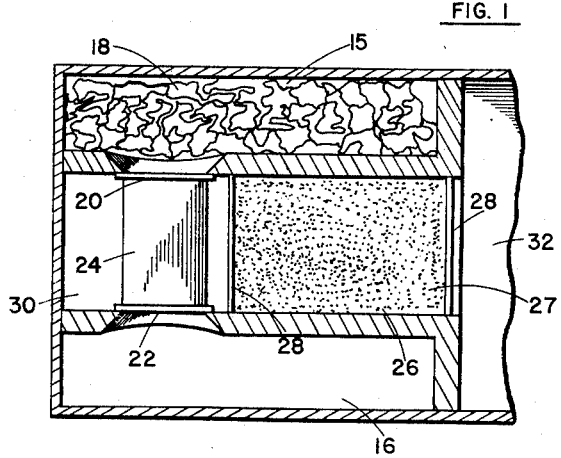
FIG. 2 is a schematic view of a second embodiment of our invention.

In the embodiment shown in FIG. 2, chambers 15 and 16 are loaded with an inert gas, such as helium or argon. Chamber 15 additionally contains a quantity of uranium foil 18 which serves as a source of fission heat. The chambers are separated by diaphragms 20 and 22 with a coupling pin 24 from an intermediate poison storage chamber 26. Chamber 26 contains a quantity of powdered neutron absorber 27 such as boron, boron carbide, boron nitride, cadium, rare earths, etc. The neutron absorber or poison is held in place by loose fitting diaphragms or plates 28 that readily give way when the safety device trips.

In operation, neutrons absorbed in the uranium foil produce fission heat which increases the pressure in chamber 15 relative to that in chamber 16. At a critical pressure difference, the coupled diaphragms fail and the chambers are vented through chamber 30 into chamber 26. The flow of gas bursts or loosens the poison retainers 28 and carries the neutron absorber into chamber 32. As in the previous embodiment, chamber 32 is of larger volume than chambers 15 and 16, and may be situated in a high-flux region of the reactor core, so that moving the neutron absorber from its initial position produces a decrease in reactivity of the reactor.

Figure 3:
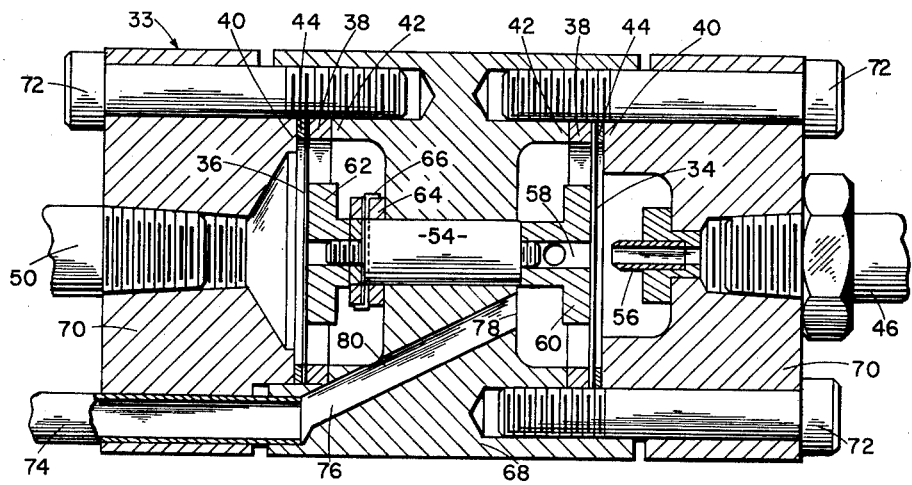
FIG. 3 is a section through another coupled diaphragm assembly for use in power reactor safety devices.
Figure 4:
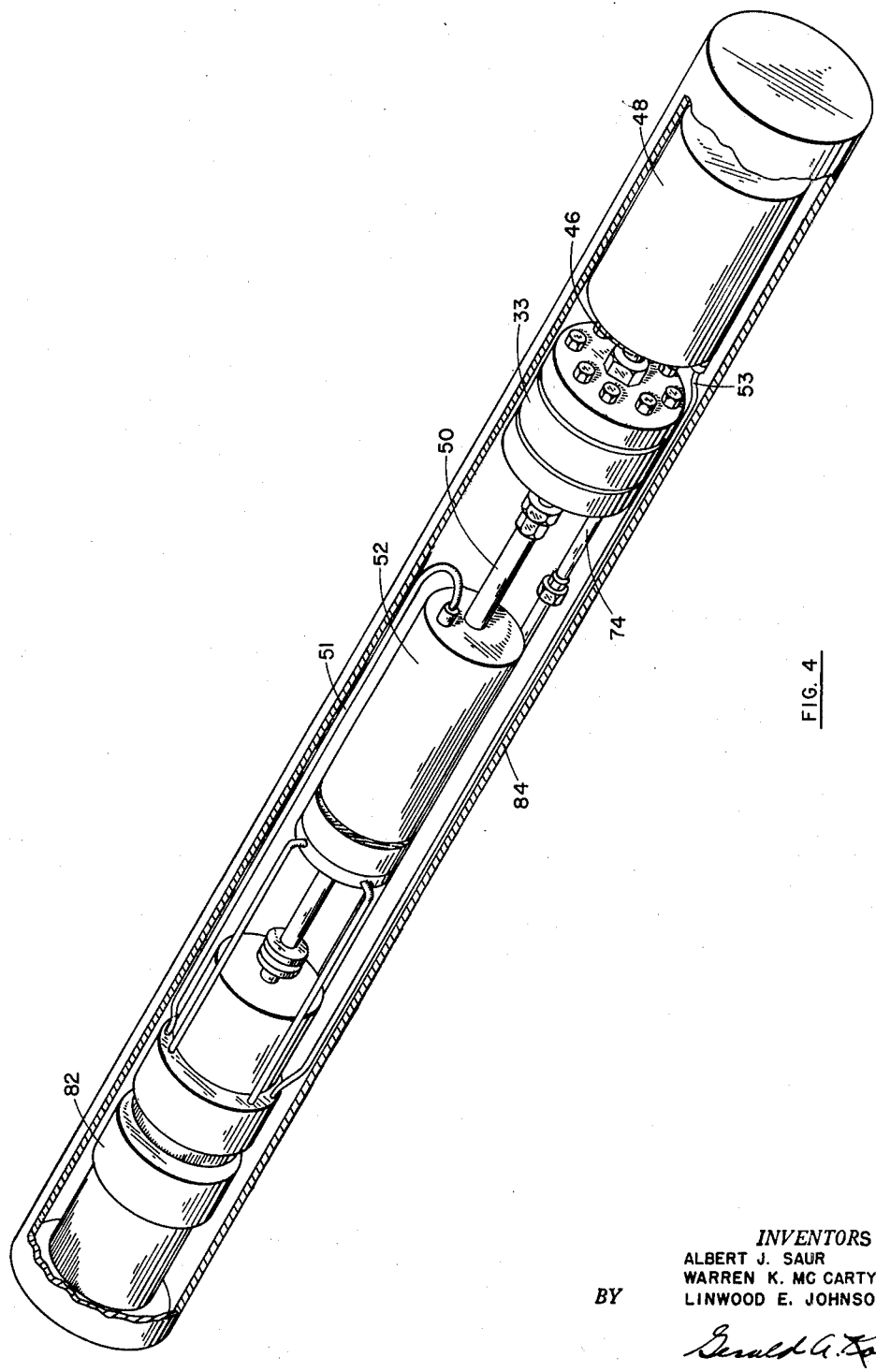
FIG. 4 is a perspective, partly cut away, of the entire device utilizing the trigger mechanism of FIG. 3.

In FIG. 3 is shown the coupled diaphragm trigger assembly 33 employed in the safety device of FIG. 4. The diaphragms 34 and 36 are held between rings 38 and washers 44 which in turn are clamped between shoulders 40 and 42. The diaphragm 34 communicates through a line 46 to a reference chamber 48 (FIG. 4). The diaphragm 36 communicates through a line 50 to the sensor chamber 52. The sensor and reference chambers are initially equally pressurized with helium gas through fill lines 51 and 53, and the pressure in both chambers will vary with ambient temperature. The sensor chamber 52 is also provided with a heater consisting of a uranium-loaded wire (not shown) which produces heat in the chamber at a rate proportional to the neutron flux. The gas in the sensor chamber absorbs this heat and its pressure correspondingly exceeds that of the gas in the reference chamber. The coupled diaphragms compare the pressures in the sensor and reference chambers through coupling pin 54. When the sensor pressure exceeds the reference pressure by a certain amount, the trigger actuates. Helium gas is then released and blows a neutron absorbing powder into the safety device receiver, as described below.

A piercing pin 56 is provided to reduce the coupled differential pressure required for a diaphragm rupture. The piercing pin is positioned on the reference chamber side of the trigger assembly. As the coupled diaphragms deflect under the coupled differential pressure, diaphragm 34 hits the piercing pin 56 which starts a rupture of the diaphragm, reducing the failure pressure. A hole 58 is drilled in the cap 60 of coupling pin 54 adjacent the piercing pin so that the diaphragm can be pushed over piercing pin 56. The cap 62 of the coupling pin providing support for diaphragm 36 is spaced from the center body 68 by a collar 64. The collar, in turn, is spaced from cap 62 by a shear pin 66 passing through the collar and the shaft of the coupling pin. The shear pin 66 prevents coupling pin 54 from moving as the differential pressure increases until it shears at some predetermined differential pressure. The coupling pin is then free to move rapidly against piercing pin 56. Since the pressure difference required to shear the pin is greater than that to pierce the diaphragm, the coupling pin rams diaphragm 34 against the piercing pin and punctures it. With the shear pin, the trip point of the trigger assembly is more reproducible because the pin is not subjected to a clamping stress which may be different in each assembly, as are the diaphragms. The shear pin also prevents the diaphragm from resting on the piercing pin during normal operation, a condition which would produce premature failure of the diaphragms because of the continuous, high stresses produced.

The center body 68 of the trigger assembly, after insertion of the coupling pin and diaphragms, is then closed with cover caps 70 joined to the center body with cap screws 72. Upon failure of the diaphragms, the pressurized gases from both the sensor and reference chambers are vented out of the assembly through line 74. A duct 76 in the center member 68 joins this outlet line. The gas vented from the reference chamber communicates with the duct through port 78, and the gas released from the sensor chamber communicates with the common duct through port 80.

When the coupled diaphragms in the trigger assembly fail, the relatively high pressure gas behind them is released through connecting line 74 and flows into the powder storage chamber 82, as shown in FIG. 4. The gas pressure blows the powder storage chamber open and carries the boron powder from its stored condition outside the reactor core into the in-core volume of the safety device throughout housing 84 in a large surface area configuration. Grooves on the wall of the housing retain the powder. Since the boron powder is stored outside the reactor core, or at least not in a high flux region, the neutron flux pattern of the reactor during normal operation is not affected or poisoned by the boron or other absorbing material kept in the powder storage chamber. The released gas pressure can be equally well used, in other adaptations of our invention, to drive a control element into the reactor, or a moderating or reflector element therefrom, thereby also decreasing reactivity.

EXAMPLE

The following example is offered to illustrate our invention in greater detail and gives specific design details of the device shown in FIGS. 3 and 4. The outside diameter of the assembly is 2 inches, the diaphragms are 1 5/16 inches in diameter with a free diameter of 1 1/8 inches. The coupling pin face is 0.710 inch in diameter. The piercing pin is 0.116 inch in diameter and is fabricated of tungsten carbide for hardness at elevated temperatures. The diaphragms are fabricated from 0.001 inch thick Inconel sheet, and the shear pin is 0.025 inch diameter Inconel wire. The sensor and reference chambers are pressurized to a relatively high helium gas pressure, for instance about 1000 p.s.i., and the coupled diaphragms set to fail at a pressure differential of about 100–200 p.s.i. In tests with a coupled diaphragm and piercing pin, but no shear pin, the failure pressure differential was 100 p.s.i., and the coupled diaphragms with shear pin and piercing pin failed at a differential pressure of 180 p.s.i. A typical record of a time response test is shown below in the table.

*Table*

TIME RESPONSE TEST RESULTS

| Event | Elapsed Time (seconds) |
|---|---|
| Exponential power increase started—0.2 second period | 0 |
| Trigger trips | 1.10 |
| Powder released | 1.15 |
| Powder 42.5 inches down receiver | 1.19 |
| Powder fully dispersed | 1.23 |

The foregoing example is illustrative, rather than restrictive, of our invention. Various modifications in detail may be made to our inevntion while maintaining the basic feature of providing a coupled diaphragm reactor safety device which is essentially independent of ambient temperature. Therefore, our invention should be understood to be limited only as is indicated in the appended claims.

We claim:
1. A flux-responsive safety device for a nuclear reactor comprising a plurality of connecting chambers, a plurality of diaphragms positioned between said chambers, means coupling and supporting said diaphragms, fluid in said chambers under initially equal pressure, means in one of said fluid-containing chambers temperature-responsive to neutron flux, and neutron absorbing means adapted to be inserted by said fluid into said reactor upon rupture of said diaphragms.

2. A flux-respsonsive safety device for a nuclear reactor comprising a housing, a plurality of spaced diaphragms positioned in said housing, means coupling and supporting said diaphragms, a plurality of chambers containing fluid under initially equal pressure communicating with said diaphragms, means in one of said chambers temperature-responsive to neutron flux, neutron absorbing means, an additional chamber under relatively lower fluid pressure than the first-named chambers and communicating with said diaphragms on the opposite faces thereof of said first-named chambers, said additional chamber being adapted to receive said neutron absorbing means, whereby a sharp flux increase creating a differential pressure between said diaphragms causes failure thereof, venting the fluid from said first-named chambers and causing insertion of said neutron absorbing means into said second-named chamber to decrease the reactivity of said reactor.

3. A flux-responsive safety device for a nuclear reactor comprising a plurality of interconnecting chambers, a plurality of diaphragms separating said chambers, means in one chamber coupling and supporting said diaphragms, the other chambers containing gas under initially equal pressure, means in one of said gas-containing chambers temperature-responsive to neutron flux, an additional chamber in said reactor communicating with said coupling means-containing chamber, neutron absorbing means adapted to be inserted into said reactor chamber by said gases, whereby a sharp flux increase creating a differential pressure between said diaphragms causes failure thereof, venting gas from said chambers and injecting said neutron absorbing means into said reactor chamber.

4. The apparatus of claim 3 wherein said plurality of interconnected chambers comprises three chambers connected in series and separated by two diaphragms, said coupling means being positioned in the middle chamber.

5. A flux-responsive safety device for a nuclear reactor comprising a housing, a plurality of interconnected chambers within said housing, two spaced diaphragms positioned in said housing separating and defining two of said chambers, means coupling and supporting said diaphragms, gas under intially equal pressure in said two chambers, means in one of said two chambers temperature-responsive to neutron flux, a third said chamber relatively larger than said two chambers communicating with said diaphragms on the opposite faces thereof of said two chambers, said third chamber being at a relatively lower pressure than said two chambers, and neutron absorbing means adapted to be inserted into said third chamber by said gases upon rupture of said diaphragms.

6. A flux-responsive safety device for a nuclear reactor comprising a housing, two spaced diaphragms positioned in said housing defining three chambers in series, means positioned in the middle chamber coupling and supporting said diaphragms, said outer chambers containing gas under initially equal pressure communicating with said diaphragms, one of said outer chambers having means temperature-responsive to neutron flux, a receiver chamber in said reactor communicating with said center chamber, neutron absorbing means adapted to be injected into said receiver chamber by said gases in said outer chambers upon rupture of said diaphragms by a pressure differential created by a sharp flux increase.

7. The apparatus of claim 6 wherein said center chamber is initially at lower pressure than said outer chambers, and communicates with a source of neutron absorbing material, said source in turn communicating with said receiver chamber in said reactor, whereby gases released from said outer chambers upon rupture of said diaphragms transport said absorber material into said receiver chamber.

8. A flux-responsive device for a nuclear reactor comprising a trigger member, said trigger member comprising a housing, two spaced diaphragms dividing said housing into three chambers in series, an inert gas in the outer chambers at relatively higher pressure than inert gas in said middle chamber, a coupling pin in said middle chamber coupling and supporting said diaphragms equally; a sensor chamber spaced from said trigger member communicating with a first said outer chamber, said sensor chamber containing inert gas at the same pressure as said first outer chamber and further containing means temperature-responsive to neutron flux; a reference chamber spaced from said trigger member communicating with the second outer chamber, said reference chamber containing an inert gas at the same pressure as said second chamber and also initially at the same pressure as the gas in said sensor chamber; a chamber spaced from said trigger member communicating with said center chamber and containing a neutron absorber; and a receiver chamber in said reactor communicating with said absorber-containing chamber, said absorber chamber adapted to discharge said neutron absorber into said receiver chamber upon urging by gases released from said outer chambers in said trigger member upon rupture of the diaphragms by differential pressure created by a sharp flux increase.

9. The apparatus of claim 8 wherein said diaphragms are spaced substantially parallel, and said coupling pin is positioned centrally and normally against said diaphragms.

10. The apparatus of claim 8 wherein said diaphragms are spaced substantially parallel, said coupling pin is positioned normally and centrally of and equally supports each diaphragm, and a piercing pin is positioned behind said diaphragm communicating with said reference chamber such that upon the creation of a differential pressure by a flux increase said diaphragm is driven against said piercing pin by said coupling pin, thereby causing failure of both said diaphragms.

11. The apparatus of claim 10 wherein said coupling pin is provided with means including a shear pin to prevent moving of the coupling pin by the diaphragm communicating with the sensor chamber until the shear pin is sheared.

References Cited in the file of this patent
UNITED STATES PATENTS
2,987,455    Huston et al. _____ June 6, 1961